United States Patent [19]

Patsiokas et al.

[11] Patent Number: 5,285,443
[45] Date of Patent: Feb. 8, 1994

[54] METHOD AND APPARATUS FOR SYNCHRONIZING A TIME DIVISION DUPLEXING COMMUNICATION SYSTEM

[75] Inventors: Stelios J. Patsiokas, Plantation; Gary S. Lobel; Craig A. Lee, both of Boynton Beach, all of Fla.

[73] Assignee: Motorola, Inc., Schaumburg, Ill.

[21] Appl. No.: 935,073

[22] Filed: Aug. 25, 1992

[51] Int. Cl.$^5$ .................... H04B 7/26; H04M 11/00
[52] U.S. Cl. .................... 370/29; 370/95.3; 370/100.1; 379/61; 379/63; 455/51.1; 455/51.2; 455/56.1; 455/88
[58] Field of Search .............. 370/24, 29, 95.1, 95.2, 370/95.3, 100.1, 104.1, 26; 379/57, 58, 59, 60, 61, 62, 63; 455/33.1, 33.2, 34.1, 34.2, 49.1, 50.1, 51.1, 53.1, 54.1, 54.2, 56.1, 57.1, 63, 69, 70, 88, 51.2; 340/825.44

[56] References Cited

U.S. PATENT DOCUMENTS

| | | | |
|---|---|---|---|
| 4,696,051 | 9/1987 | Breeden | 455/56.1 |
| 4,718,109 | 1/1988 | Breeden et al. | 455/56.1 |
| 4,881,271 | 11/1989 | Yamauchi et al. | 379/59 |
| 4,935,927 | 6/1990 | Kaewell, Jr. et al. | 455/51.1 |
| 4,980,907 | 12/1990 | Raith | 379/63 |
| 5,020,051 | 5/1991 | Beesley et al. | 370/29 |
| 5,040,205 | 8/1991 | Kunihiro | 379/63 |
| 5,124,698 | 6/1992 | Mustonen | 455/51.1 |
| 5,202,912 | 4/1993 | Breeden et al. | 379/57 |
| 5,228,026 | 7/1993 | Albrow et al. | 370/29 |

Primary Examiner—Douglas W. Olms
Assistant Examiner—Alpus H. Hsu
Attorney, Agent, or Firm—Pablo Meles; Thomas G. Berry; Daniel R. Collopy

[57] ABSTRACT

A method and apparatus are provided for synchronizing over-the-air time division duplexing communication within a defined geographical coverage area (201) of a communication system (200) that provides at least cordless radiotelephone operation between a plurality of portable radiotelephone transceivers and a plurality of telepoint base stations (202, 204, 206) geographically located within the coverage area (201). The communication system (200) transmits over-the-air a synchronization timing signal (203) including timing information corresponding to a transmit-and-receive duty cycle timing for time division duplexing communication. At least one telepoint base station (204, 206) within the coverage area (201) receives the synchronization timing signal (203). The at least one telepoint base station (204, 206) synchronizes its over-the-air time division duplexing communication transmit-and-receive duty cycle timing to the timing information.

17 Claims, 4 Drawing Sheets

100

MUX2 FRAME STRUCTURE 400

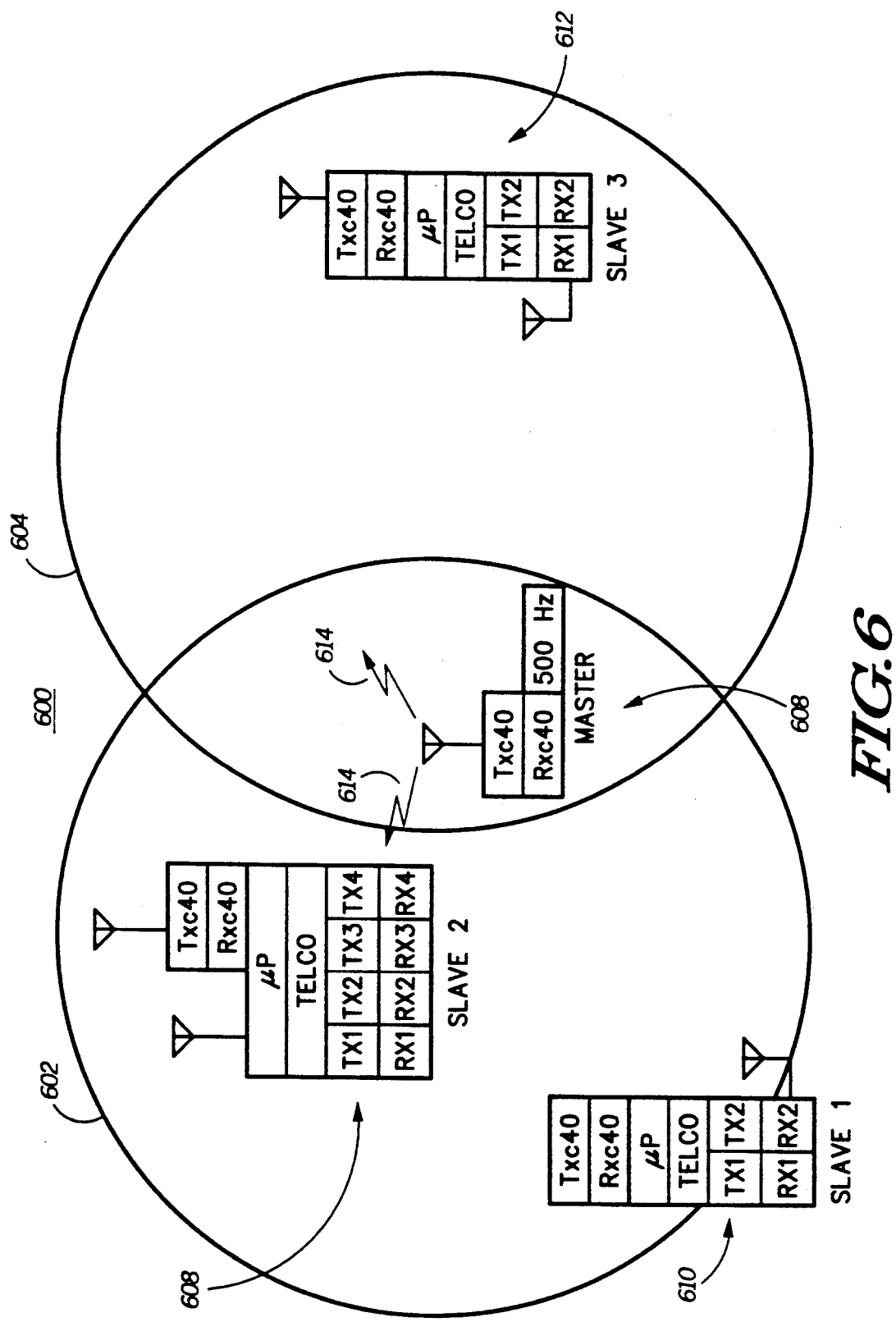

METHOD AND APPARATUS FOR SYNCHRONIZING A TIME DIVISION DUPLEXING COMMUNICATION SYSTEM

FIELD OF THE INVENTION

This invention relates generally to cordless radiotelephone communication systems, and more specifically to a method and apparatus for synchronizing time division duplexing communication in a cordless radiotelephone communication system.

BACKGROUND OF THE INVENTION

A city-wide telepoint system based on second generation cordless telephony (CT-2) technology provides service within small isolated "islands of coverage", each defined by a limited radio coverage range provided by one or more stationary communication units, e.g., base units or base stations, located therein. Cordless telephone handset units (CT handsets) are portable communication transceiver units, e.g., portable radiotelephone transceivers, that can access the public switched telephone network (PSTN) via any accessible base unit within communication range. Each base unit typically can handle one or more independent communications with one or more CT handsets, respectively, over a limited number of adjacent communication channels. A public telephone booth, or base unit, can support up to twelve to sixteen simultaneous conversations at the same location.

Each independent communication between a CT handset and a base unit utilizes full duplex burst transmission communication over a single channel. The base unit transmits a burst of information for a predetermined time interval, e.g., for one millisecond, while the CT handset receives the transmitted information. Then, for the next predetermined time interval, e.g., for the next millisecond, the CT handset transmits its burst of information and the base unit receives the transmitted information. This pulsed transmission exchange of information allows full duplex communication, e.g., a telephone conversation, over a single radio frequency (RF) channel.

Although the CT-2 protocol provides synchronization of the exchange of information between a base unit and a CT handset, i.e., one transmits while the other receives, multiple communications between "nearby" base units and CT handsets may not be synchronized with each other. Due to a limited number of available communication channels, some of the communications may be in very close or adjacent channels. Unsynchronized transmits and receives between two or more very close or adjacent communication channels can result in substantial interference between the respective communications because of the limited adjacent channel selectivity of the communication units and the wide band technology utilized in the front end of the transceivers, in both the base units and the CT handsets. Depending on how far the channels are apart, this interference can destroy the conversations, or it can introduce spurious "clicks" and "pops".

One approach to synchronize the time division duplexing communications between the multiple base units and CT handsets has been to interconnect the base units with wire and provide a 500 Hz synchronization signal, e.g., a 2 millisecond duty cycle square-wave signal, therebetween. Typically, a "master" base unit has supplied the synchronization timing signal to all the "slave" base units in a defined coverage area. In this way, all the base units would "burst" transmit at the same time, and then receive at the same time. The CT handsets, being synchronized by the CT-2 protocol with their respective base units, would likewise receive when the base units were transmitting and would transmit when the base units were receiving.

Regrettably, this approach has a number of drawbacks. First, wire interconnection between all the "nearby" base units is not always possible due to competitive systems being in close proximity. Second, limitations in the logistics available in certain situations can preclude physical wire interconnection between base units. Third, the additional wiring adds to the overall system cost and complexity which is a competitive disadvantage. Consequently, due to the very competitive nature of cordless radiotelephone communication systems, such as CT-2 systems, a better solution to this problem is necessary.

SUMMARY OF THE INVENTION

According to an embodiment of the present invention, there is provided a method and apparatus for synchronizing over-the-air time division duplexing communication within a defined geographical coverage area of a communication system that provides at least cordless radiotelephone operation between a plurality of portable radiotelephone transceivers and a plurality of telepoint base stations geographically located within the coverage area, the method comprising the steps of: transmitting over-the-air a synchronization timing signal comprising timing information corresponding to a transmit-and-receive duty cycle timing of the time division duplexing communication for the communication system, receiving the synchronization timing signal in at least one telepoint base station within the coverage area, and synchronizing the over-the-air time division duplexing communication transmit-and-receive duty cycle timing in the at least one telepoint base station within the coverage area to the timing information provided by the received synchronization timing signal.

BRIEF DESCRIPTION OF THE DRAWINGS

FIG. 6 is a block diagram of a telepoint communication system, in accordance with an alternative embodiment of the present invention.

DESCRIPTION OF A PREFERRED EMBODIMENT

Figure 8:
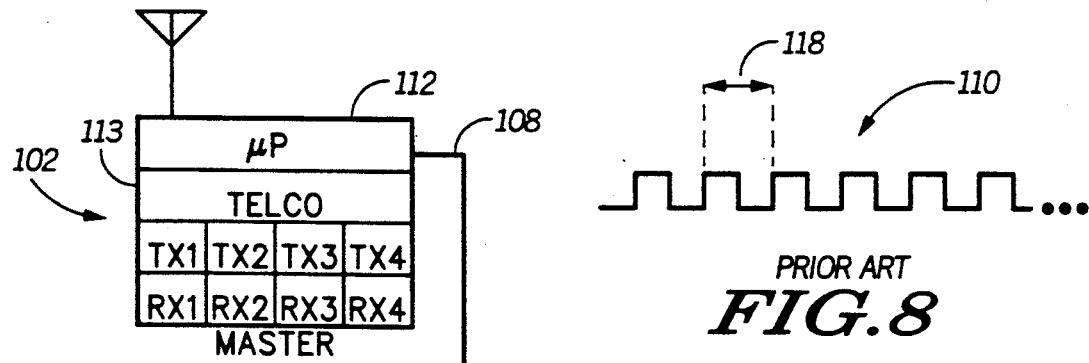
FIG. 8 is a diagrammatic illustration showing the synchronization signal in a square-wave form in the prior art CT-2 communication system.
Figure 1:
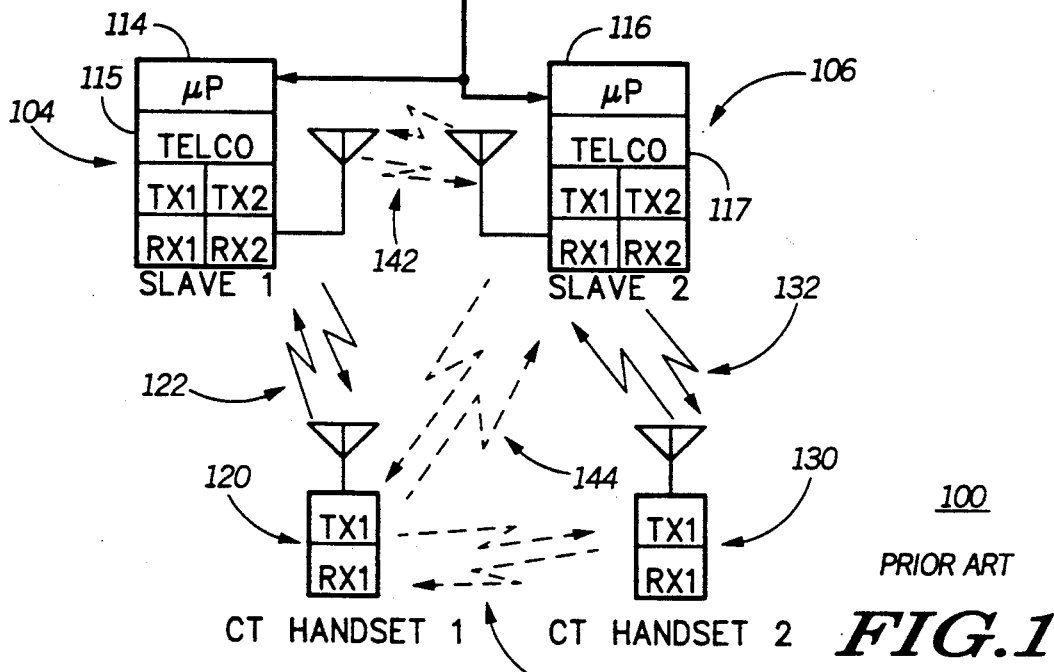
FIG. 1 is a block diagram of a prior art CT-2 communication system.

FIG. 1 shows a prior art CT-2 communication system 100, utilizing wire 108 to interconnect base units 102, 104, 106, for providing a synchronization signal 110 to all wired base units 102, 104, 106, to synchronize their time division duplexing communications over a radio frequency (RF) coverage area. A "master" base unit 102 typically provides the synchronization signal 110 over the wire interconnect 108 to the first "slave" base unit 104 and the second "slave" base unit 106. FIG. 8 shows that the synchronization signal 110 is normally a square-wave signal having a 2 millisecond duty cycle 118, which corresponds to the required frame timing for CT-2 burst mode time division duplexing communication. The master-slave interconnect 108 interfaces the "master" controller 112 of the "master" base unit 102 with the "slave" controllers 114, 116, of the respective "slave" base units 104, 106, as shown. Interface logic and protection circuits are not shown for clarity.

Each of the base units 102, 104, 106, can interface multiple radiotelephone communications with the public switched telephone network (PSTN) using independent telephone interfaces 113, 115, 117, in a manner well known to those skilled in the art. For example, a first CT handset 120 is shown in a time division duplexing communication 122 with the first "slave" base unit 104. One of the two transceivers, e.g., TX1/RX1 or TX2/RX2, of the base unit 104 handles the radiotelephone call 122. Similarly, a second CT handset 130 is in a time division duplexing communication 132 with the second "slave" base unit 106.

Interference 142, 144, 146, during communications 122, 132, can occur between base unit and base unit 142, between base unit and CT handset 144, and between CT handset and CT handset 146. The interference can result from lack of synchronization during time division duplexing communication between the different communications 122, 132, as discussed earlier. Therefore, to reduce the likelihood of interference, the prior art system has implemented the "square-wave" synchronization signal 110 over the interconnection wire 108 between the base units 102, 104, 106. Unfortunately, as discussed earlier, the wire interconnection 108 between the base units 102, 104, 106, has not always been possible, and added cost and complexity to the CT-2 system which have been significant drawbacks in a competitive business environment.

This synchronization signal 110 synchronizes the "burst" transmit and receive time intervals for each of the base units 102, 104, 106, and, in combination with the CT-2 protocol, it also synchronizes the respective receive and transmit time intervals of the CT handsets 120, 130, engaging in time division duplexing communication 122, 132, in the CT-2 system 100. By synchronizing all the base units 102, 104, 106, to "burst" transmit at the same time and then receive any transmitted "burst" from the respective CT handsets, the possibility for interference is reduced or totally removed.

The general operation of a CT-2 communication system of the type shown in FIG. 1 is well known and is more fully described in a related U.S. Pat. No. 5,202,912 filed Sep. 9, 1991, entitled "Method and Apparatus For Providing Telepoint to Telepoint Calling Between Pager Equipped Handsets", which is assigned to the same assignee as the present invention and is incorporated herein by reference. Additionally, the CT-2 Common Air Interface Specification, Version 1.1, published by the United Kingdom Department of Trade and Industry, London, England, on Jun. 30, 1991 describes the communication protocol to be used for the interworking between cordless telephone apparatus and the public switched telephone network.

Figure 2:
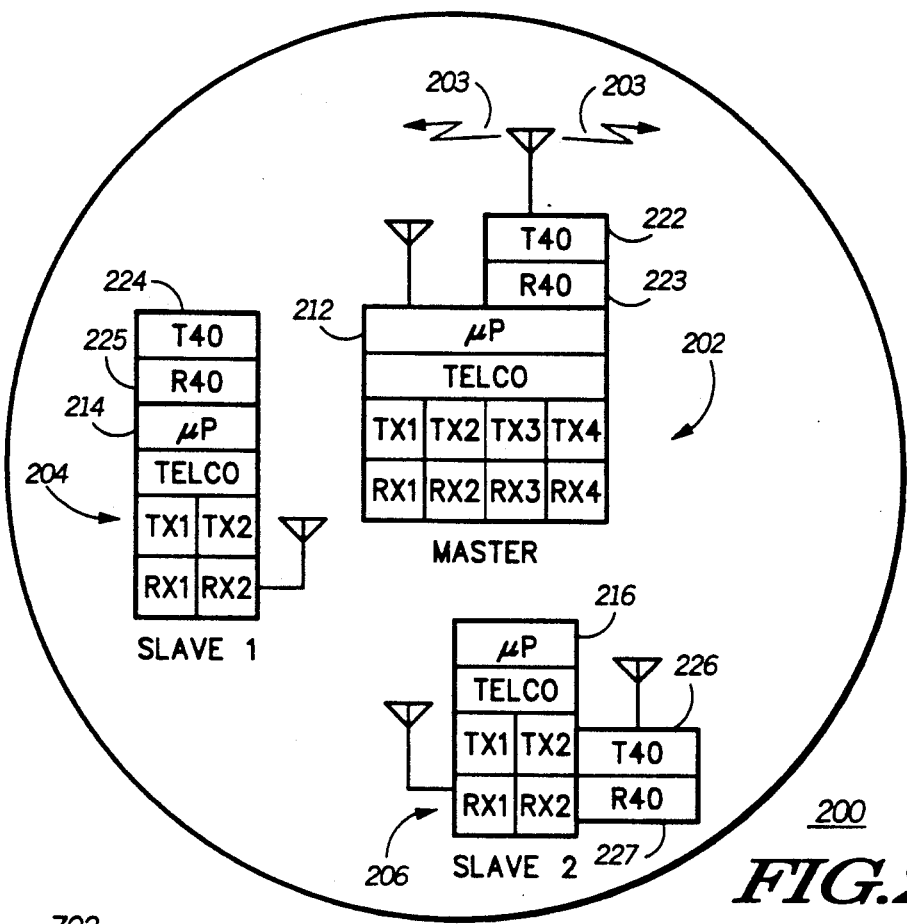
FIG. 2 is a block diagram of a telepoint communication system, in accordance with the preferred embodiment of the present invention.

FIG. 2 is a block diagram of a CT-2 communication system 200, in accordance with the preferred embodiment of the present invention. A CT-2 coverage area 201 includes a "master" base unit 202, a first "slave" base unit 204, and a second "slave" base unit 206. In this example, the "master" base unit 202 includes four transceivers, e.g., TX1/RX1, TX2/RX2, TX3/RX3, and TX4/RX4, for handling normal time division duplexing communications with up to four CT handsets. Similarly, each of the first and second "slave" base units 204, 206 includes two transceivers, e.g., TX1/RX1 and TX2/RX2, for handling normal time division duplexing communications with up to two CT handsets. Hence, this exemplary CT-2 "Island of Coverage" can service up to eight simultaneous telephone conversations with the CT handsets.

According to the preferred embodiment of the present invention, the "master" base unit 202 includes a transceiver 222, (transmitter portion) 223, receiver portion that is dedicated for communicating synchronization information with the other "slave" base units 204, 206, in the coverage area 201. Accordingly, the first "slave" base unit 204 includes a transceiver 224, 225, for communicating synchronization information, and the second "slave" base unit 206 also includes a transceiver 226, 227, for communicating synchronization information. As shown, a synchronization timing signal (203) including the synchronization information is transmitted from the "master" transceiver 222 and received by the first and second "slave" synchronization transceivers 225, 227, which are all communicating on channel 40. Of course, any other channel of the up to 40 CT-2 communication channels may be dedicated for communicating the synchronization information. Even an independent communication channel, outside of a CT-2 frequency band, may be used for communicating the synchronization information.

Therefore, in the preferred embodiment of the present invention, the "master" controller 212 can electrically couple a synchronization timing signal to the "master" transceiver 222 for transmitting a synchronization timing signal (203) over the coverage area 201. The synchronization timing signal (203) can then be received by the first and second "slave" synchronization transceivers 225, 227, and electrically coupled to the respective first and second "slave" controllers 214, 216, for synchronizing all the normal time division duplexing communications between the base units 202, 204, 206, and the respective CT handsets (not shown) in the CT-2 coverage area 201. The structure and operation of the preferred synchronization mechanism for a CT-2 communication system will be more fully discussed below.

Advantageously, by removing the previous wire interconnection between the base units 202, 204, 206, and utilizing synchronization transceivers 222, 225, 227, the CT-2 communication system 200 has a more flexible configuration and can be installed at a lower cost. Further, competitive "nearby" base units, e.g., base units from competing business entities, can communicate synchronization information over-the-air between each other without requiring physical wire interconnection therebetween. By synchronizing the time division duplexing communications of all "nearby" base units, including competitive base units, the limited number of available CT-2 communication channels can be more fully utilized. The benefits of synchronizing the time division duplexing communications of all the "nearby" base units can be achieved in a relatively automatic fashion and without requiring any physical wire interconnections between the base units. This simplifies the installation of base units, including base units from competing business entities. It also reduces system installation and operation costs, and helps utilize a maximum number of the available CT-2 communication channels with reduced possibilities for interference.

Figure 3:
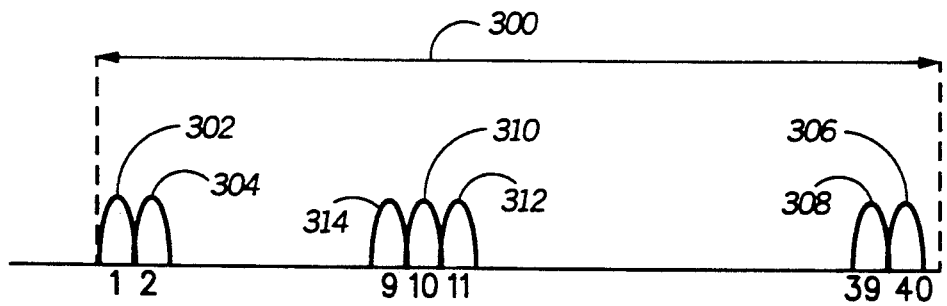
FIG. 3 is a channel allocation diagram illustrating synchronization channel selection for the preferred embodiment of the present invention.

FIG. 3 is a channel allocation diagram illustrating synchronization channel selection for the preferred embodiment of the present invention. As is well known, the CT-2 frequency band 300 includes forty (40) 100 KHz wide adjacent channels. The CT-2 channels are numbered 1 to 40. In a CT-2 coverage area, ideally, all forty channels are available for time division duplexing communications. However, interference due to limited adjacent channel selectivity tends to reduce the number of simultaneous conversations that can be time division duplexed over the available channels. That is, when a CT handset and base unit engage in a time division duplexing communication on, say, channel 10 310, the adjacent channels 9 314 and 11 312 can be affected with significant interference.

To maximize the available CT-2 channels for normal time division duplexing communication, the synchronization information between the "master" and "slave" base units is preferably transmitted on either channel 1 302 or channel 40 306. In this way, only one other adjacent channel may be affected with interference. That is, when the synchronization information is communicated on channel 1 302 then channel 2 304 may also be affected, and when the synchronization information is transmitted on channel 40 306 then adjacent channel 39 308 may be affected. Therefore, by selecting one of the outer-most available CT-2 channels for communicating the synchronization information between the base units, a maximum number of the remaining available CT-2 channels are unaffected with interference, and can be utilized for normal time division duplexing communications with the CT handsets.

The CT-2 communication protocol supports four different burst structures (MUX3, MUX2, MUX1.4 and MUX1.2) for communicating over a CT-2 communication channel, typically between a base unit and a CT handset. Specifically, time division duplexing communication using the MUX2 frames, or burst structures, by definition comprises 1 msec. transmit and 1 msec. receive cycles at both communication units. Typically, during normal operation using the MUX2 communication mode, a base unit exchanges data with a CT handset before commencing point to point voice communication in the MUX1 (MUX1.4 or MUX1.2) mode. For example, in the MUX2 mode, authentication information is exchanged between the CT handset and the base unit before allowing the "dial tone" and telephone access to the caller at the CT handset. Therefore, the MUX2 frames are well suited for communicating the synchronization information between "master" and "slave" base units.

Figure 4:
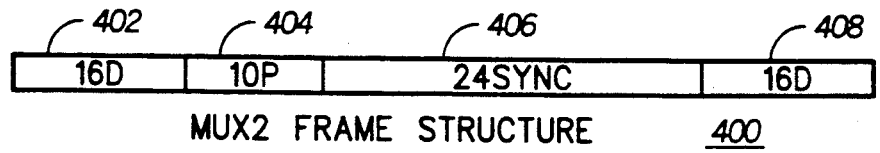
FIG. 4 is a timing diagram illustrating a synchronization signal according to the preferred embodiment of the present invention.

FIG. 4 is a timing diagram illustrating a synchronization timing signal in a MUX2 frame structure 400 according to the preferred embodiment of the present invention. MUX2 frame communication is the preferred mode of communicating the synchronization information between the "master" and "slave" base units because it inherently provides the 1 msec. transmit and receive timing information and is defined for exchanging data signals between communication units, e.g., between a base unit and a CT handset. Hence, in the preferred embodiment, the "master" transceiver 222 (FIG. 2) transmits continuously a series of MUX2 frames to the first and second "slave" transceivers 225, 227, to communicate the synchronization information therebetween. Each MUX2 frame 400 allows communication of 16 data bits 402, 10 preamble bits 404, a 24 bit synchronization code 406, and 16 additional data bits 408. The transmission structure and format of the contents of a MUX2 frame is well known to those skilled in the art. After the transmitting "master" transceiver 222 transmits the MUX2 frame, all the receiving "slave" 5 transceivers 225, 227, can receive the MUX2 frame, and then bit-synchronize and frame-synchronize to the transmitted MUX2 frame. Each MUX2 frame is transmitted in a 1 msec. burst followed by a 1 msec. pause. In this way, a series of MUX2 frames can be communicated between the "master" base unit 202 and the "slave" base units 204, 206, to provide synchronization timing information therebetween.

Optionally, the 16 data bits 402, 408, in the MUX2 frame structure 400 can include other information for transmitting between the "master" and the "slave" base units 202, 204, 206. For example, "master" identification information can be transmitted with every MUX2 frame 400 in the data bits 402, 408. In this way, all the nearby "slave" base units can affirmatively recognize the transmissions of synchronization information from the "master" base unit in their defined coverage area 201. Hence, an interference signal from another transmitting unit, such as from a "master" base unit in another coverage area, can be quickly detected and corrective action taken.

In summary, for the preferred embodiment of the present invention, the synchronization timing information is transmitted from the "master" base unit 202 to the "slave" base units 204, 206, on either channel 1 or channel 40 (the outer-most channels) using MUX2 frame communication. This over-the-air communication of the synchronization timing signal to provide the synchronization timing between the "master" and "slave" base units can be effected over the entire coverage area 201 without using wire interconnection. As mentioned earlier, by transmitting the synchronization signal over-the-air instead of by physical wire interconnection, the preferred embodiment of the present invention can simplify system configuration and installation, reduce overall system costs, and allow competitive systems to operate in close proximity to each other while maximizing utilization of the available CT-2 channels for communication.

Figure 5:
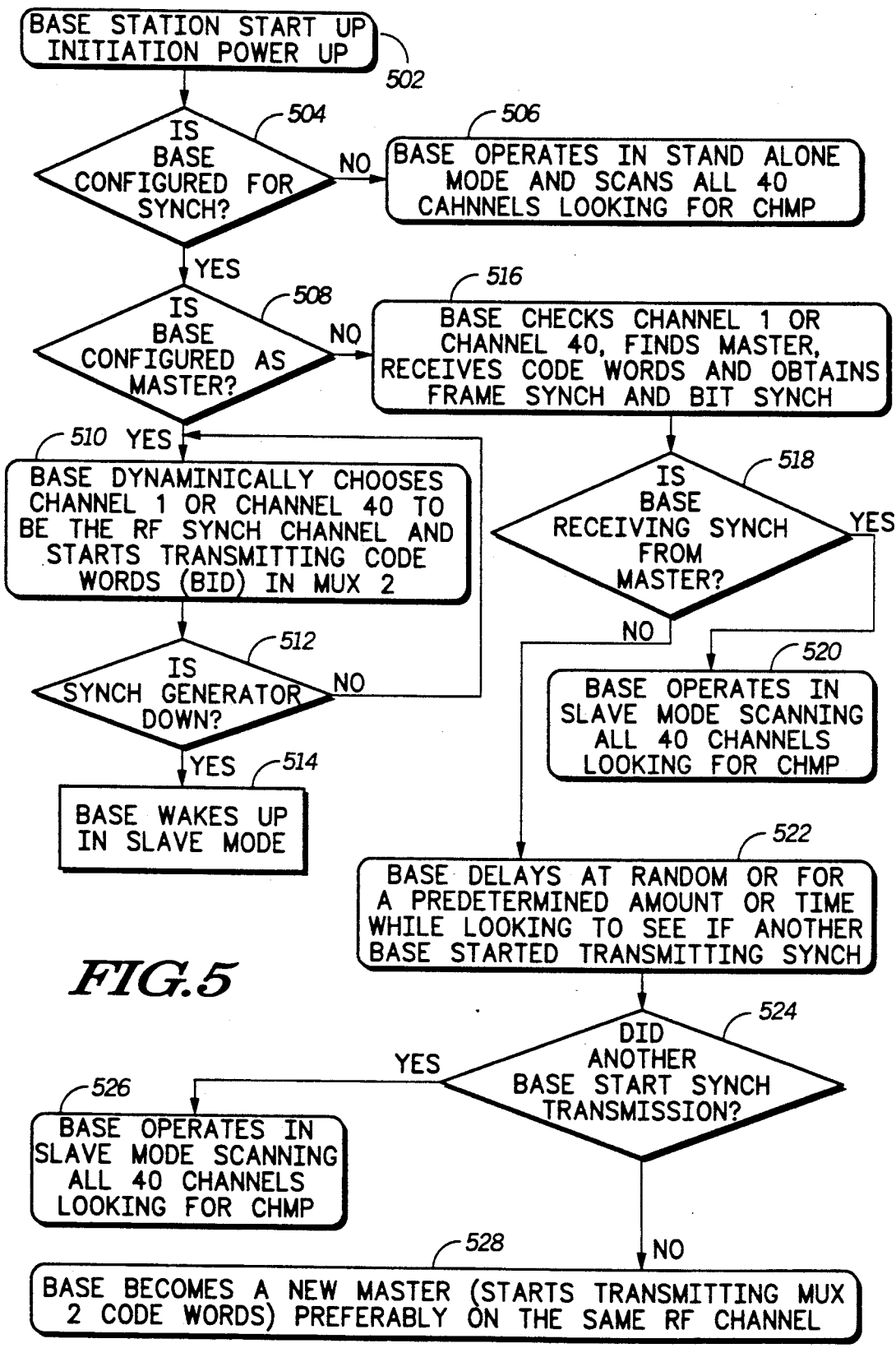
FIG. 5 is a flow diagram illustrating an operational sequence for a base unit, according to the preferred embodiment of the present invention.

FIG. 5 is a flow diagram illustrating an operational sequence for a CT-2 base unit, according to the preferred embodiment of the present invention. As discussed before, there are two types of base units in a coverage area 201 (FIG. 2). There is a "master" base unit 202, and there are one or more "slave" base units 204, 206. The exemplary operational sequence shown in FIG. 5 illustrates the steps taken by any one of the base units 202, 204, 206, starting from an initial power-up sequence 502. Typically, one of the base units is configured as a "master" base unit 202. This is done, for example, by setting one or more internal jumpers or hardware switches in the base unit 202, or by having the information programmed into a non-volatile memory (not shown) in the controller 212 such that the controller 212, following a start-up initialization sequence 502, can test 504 whether the base unit 202 is configured for over-the-air communication of synchronization information, and then test 508 whether the particular base unit 202 is configured as a "master" or a "slave" base unit.

If the controller 212 determines 504 that it is not configured for over-the-air communication of synchronization information then the base unit operates 506 in a stand alone mode, scanning all forty channels for potential communication with the CT handsets. On the other hand, if the controller 212 determines 504 that it is configured for over-the-air communication of synchronization information then it further tests 508 whether the base unit 202 is configured as a "master" or a "slave" base unit.

If the base unit is configured as a "master" base unit then the base unit 202 dynamically chooses 510 either CT-2 communication channel 1 or channel 40 to be the RF synchronization channel. The base unit 202 can dynamically choose between channel 1 or channel 40 by determining which one of the two communication channels is free, in that order. The definition of a free channel is provided in the CT-2 Common Air Interface Specification.

Once the "master" base unit 202 selects one of the channels, such as channel 40, it begins transmitting code words in MUX2 mode to provide synchronization information on the selected channel. As long as the "master" base unit can generate and transmit the synchronization signal 512, the "master" base unit 202 continues to transmit the MUX2 frames with the synchronization information. If the "master" base unit 202 cannot transmit the synchronization information 512, such as because the transmitter 222 is not functional, then the base unit 202 reinitializes its synchronization operation and changes its operation mode to "slave" base unit operation 514. In this way, the operation of the CT-2 system can be self-healing because, even when the "master" base unit can not operate to transmit the synchronization signal, the "master" base unit 202 can still receive a synchronization signal and operate as a "slave" base unit. Another base unit in the coverage area can then take over the function of the "master" base unit, as will be discussed below.

Alternatively, if the base unit 202, following the startup initialization sequence 502, 504, determines 508 that it is configured as a "slave" base unit then it checks 516 both channel 1 and channel 40 to find the transmission of the synchronization signal from a "master" base unit. If the "slave" base unit receives the MUX2 frames, it both bit-synchronizes and frame-synchronizes to the synchronization signal. As discussed earlier, the synchronization signal transmitted in the MUX2 bursts provides the necessary timing information to all the "slave" base units in a coverage area 201 to synchronize their time division duplexing communications with the CT handsets. As long as the "slave" base unit is receiving 518 the synchronization signal from the "master" base unit, the "slave" base unit continues to operate 520 in the "slave" mode. In all other respects, the "slave" base unit operates normally, such as scanning all the remaining CT-2 communication channels for possible communications with CT handsets.

If the CT-2 "slave" base unit, on the other hand, determines 518 that it is not receiving the synchronization signal from a "master" base unit, the "slave" base unit goes into a self corrective routine 522 to reestablish a synchronization timing signal for the coverage area 201. Specifically, the "slave" base unit may delay for a random time interval or for a predetermined time interval while continuously looking for the synchronization timing signal in either of the two alternative CT-2 synchronization channels, e.g., channel 1 or channel 40. If the "slave" base unit detects 524 the synchronization timing signal being transmitted on either one of the two alternative synchronization channels then it returns to the "slave" operational mode 526.

If after either the random time interval or the predetermined time interval has expired, as defined for the particular CT-2 system, and the "slave" base unit has not detected the synchronization signal being transmitted on the either of the two alternative synchronization channels then the base unit becomes a new "master" base unit and begins transmitting the synchronization signal using the MUX2 burst transmissions, preferably on the originally selected synchronization channel. Of course, the new "master" base unit can transmit the synchronization signal on the same synchronization channel as previously defined for the coverage area 201 or on the alternative synchronization channel. If interference is detected in the originally defined synchronization channel, then the new "master" base unit may begin transmission of the synchronization signal on the alternative synchronization channel, either channel 1 or channel 40. The "slave" base units in the coverage area will "find" the new transmission of the synchronization timing signal, even if transmitted in the alternative synchronization channel.

By providing each base unit with a synchronization transceiver, the CT-2 communication system 200 can maintain transmission of the synchronization signal over a coverage area 201 even when a "master" base unit can not transmit the synchronization signal because one of the alternative "slave" base units can take over as the new "master" base unit and begin transmitting the synchronization information for the other base units as necessary. Further, by utilizing alternative synchronization channels, e.g., channel 1 and channel 40, the CT-2 communication system can adapt to changing communication and interference patterns over the adjacent communication channels and continue to transmit over-the-air the system synchronization timing information on an alternative synchronization channel as necessary. This makes the CT-2 communication system self-healing in that it can correct itself when, for example, the "master" base unit cannot operate to transmit the synchronization signal over the synchronization channel. Another base unit can automatically take over the "master" base unit function for transmitting the synchronization information in the coverage area.

FIG. 6 is a block diagram of an alternative CT-2 system configuration, in accordance with an alternative embodiment of the present invention. In certain system situations, possibly due to geographical limitations of a coverage region, a CT-2 "master" base unit 606 may transmit the synchronization timing signal 614 in two or more overlapping coverage areas 602, 604, to cover a larger coverage region. For example, in a CT-2 communication system, a "master" base unit 606 may transmit the synchronization timing signal 614 in a coverage region that extends from a first street defining a first coverage area 602 and wraps around an intersection with a second street defining a second coverage area 604. Hence, the "master" base unit 606 is preferably located at the intersection of the two streets where the first coverage area 602 overlaps with the second coverage area 604. In this way, the "master" base unit 606 provides the synchronization timing signal to the "slave" base units 608, 610, 612, in two or more overlapping coverage areas 602, 604.

A potential problem arises when the "master" base unit 606 is unable to transmit the synchronization signal 614. The remaining "slave" base units 608, 610, 612, need to continue synchronizing the time division duplexing communications with their respective CT handsets. One possible solution is for the "slave" base units 608, 610, 612, to follow the operational sequence previously illustrated in FIG. 5. In this case, each of the overlapping coverage areas 602, 604, can independently maintain its own synchronization timing information for all its respective base units. This independent synchronization of overlapping coverage areas, however, is not always possible. Consequently, a second possible solution is discussed below.

Figure 7:
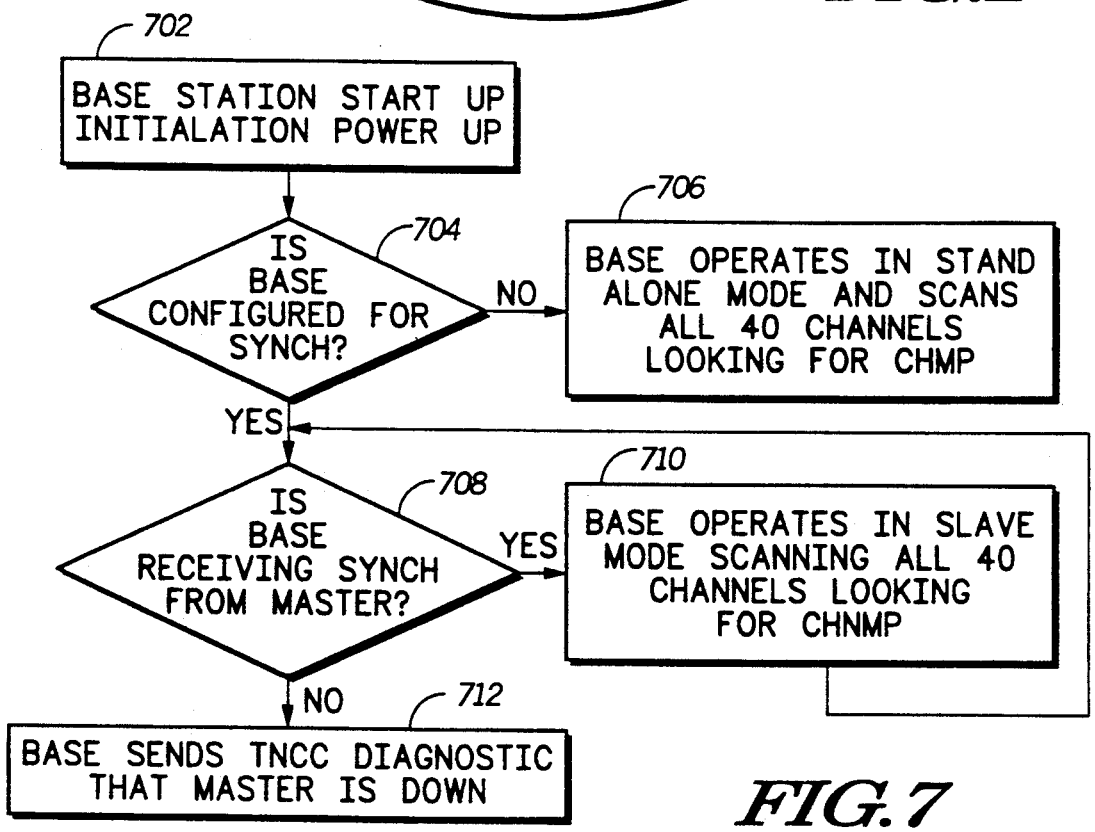
FIG. 7 is a flow diagram illustrating an operational sequence for a base unit, according to the alternative embodiment of the present invention.

FIG. 7 is a flow diagram illustrating an operational sequence for a CT-2 "slave" base unit, according to the alternative embodiment of the present invention. Following an initialization and power-up sequence 702, a base unit determines 704 whether it is configured for communication of the synchronization timing signal over a CT-2 communication channel. If it is not configured for such communication of the synchronization signal, then the base unit operates 706 in a stand-alone mode, scanning all 40 channels and engaging in time division duplexing communications with the CT handsets. On the other hand, if it is configured 704 for over-the-air communication of the synchronization timing information then the base unit determines 708 if it is receiving the synchronization timing information from a "master" base unit. As long as it continues to receive the synchronization timing information from a "master" base unit, the "slave" base unit operates in the "slave" mode, and maintains normal time division duplexing communication with CT handsets in the remaining CT-2 communication channels. When the "slave" base unit detects 708 that it is not receiving the synchronization timing information from a "master" base unit it then enters a corrective routine 712 to maintain an internal synchronization signal and also to notify the Telepoint Network Control Center (TNCC) that the "master" base unit is not operational. In this way, service technicians are notified of a system malfunction at the "master" base unit, and can take appropriate corrective action.

Thus, a new method and apparatus for synchronizing the time division duplexing communications in a CT-2 communication system has been shown. By utilizing one of the CT-2 communication channels, such as channel 1 or channel 40, to communicate the synchronization timing information between a "master" base unit and its associated "slave" base units in a coverage area, the CT-2 communication system is not constrained to the previous more complicated and costlier wire interconnection approach. In view of the discussion above, it may be appreciated by now that the present invention provides a more flexible and cost effective solution for synchronizing the time division duplexing communications in a CT-2 communication system, while allowing even competitive systems to operate in close proximity to each other and at the same time utilizing a maximum number of the available CT-2 communication channels.

What is claimed is:

1. A method for synchronizing over-the-air time division duplexing communication within a defined geographical coverage area of a communication system that provides at least cordless radiotelephone operation between a plurality of portable radiotelephone transceivers and a plurality of telepoint base stations geographically located within the coverage area, the method comprising the steps of:
   transmitting over-the-air by a first one of the plurality of telepoint base stations a synchronization timing signal comprising timing information corresponding to a transmit-and-receive duty cycle of the time division duplexing communication for the communication system;
   receiving the synchronization timing signal in at least one other than said first one of the plurality of telepoint base stations within the coverage area; and
   synchronizing the over-the-air time division duplexing communication transmit-and-receive duty cycle timing in the at least one of the plurality of telepoint base stations within the coverage area to the timing information provided by the received synchronization timing signal.

2. The method of claim 1, wherein one of the plurality of telepoint base stations within the coverage area performs the transmitting step, and the rest of the plurality of telepoint base stations within the coverage area perform the receiving step and the synchronizing step for synchronizing the over-the-air time division duplexing communications of the plurality of telepoint base stations within the coverage area.

3. The method of claim 2, wherein the transmitting step performed by one of the plurality of telepoint base stations within the coverage area comprises the step of transmitting the synchronization timing signal over one communication channel allocated within a CT-2 frequency band.

4. The method of claim 3, wherein the transmitting step comprises the step of selecting one free outer-most communication channel of the CT-2 frequency band for transmitting the synchronization timing signal thereon.

5. The method of claim 4, wherein the CT-2 frequency band includes forty communication channels, and the selecting step selects one free communication channel from a set of outer-most communication channels including channel one and channel forty.

6. The method of claim 3, wherein the synchronization timing signal transmitted over the one communication channel allocated within a CT-2 frequency band comprises a series of MUX2 frames.

7. The method of claim 6, wherein the transmitting step comprises the step of incorporating identification information in each MUX2 frame of the synchronization timing signal for identifying each MUX2 frame as being transmitted by the one of the plurality of telepoint base stations within the coverage area, the synchronization timing signal providing affirmative recognition of the transmitting one of the plurality of telepoint base stations by the receiving rest of the plurality of telepoint base stations within the coverage area.

8. The method of claim 6, wherein each of the MUX2 frames comprises a MUX2 burst transmission time interval and a MUX2 pause time interval, and wherein the step of synchronizing the over-the-air time division duplexing communication transmit-and-receive duty cycle timing includes the steps of:

defining a transmission time interval in the at least one of the plurality of telepoint base stations for over-the-air time division duplexing communication during a time interval corresponding to one of the MUX2 burst transmission time interval and the MUX2 pause time interval of each of the MUX2 frames of the synchronization timing signal, and defining a reception time interval in the at least one of the plurality of telepoint base stations for over-the-air time division duplexing communication during a time interval corresponding to the other one of the MUX2 burst transmission time interval and the MUX2 pause time interval of each of the MUX2 frames of the synchronization timing signal.

9. The method of claim 8, wherein each of the MUX2 frames comprises a MUX2 burst transmission followed by a MUX2 pause time interval, and wherein the step of synchronizing the over-the-air time division duplexing communication transmit-and-receive duty cycle timing in the rest of the plurality of telepoint base stations within the coverage area further comprises the steps of:

receiving a MUX2 burst transmission in a MUX2 frame in the received synchronization timing signal;

bit-synchronizing the time division duplexing communication for the rest of the plurality of telepoint base stations with the received MUX2 burst transmission; and frame-synchronizing the time division duplexing communication for the rest of the plurality of telepoint base stations with the received MUX2 burst transmission.

10. A telepoint communication system capable of synchronizing time division duplexing communication between a plurality of cordless telephone (CT) handsets and a plurality of base units geographically located within a defined coverage area, the telepoint communication system comprising:

a first base unit located within a defined coverage area, comprising:

first controlling means for controlling over-the-air time division duplexing communication for the first base unit, the over-the-air time division duplexing communication being synchronized to a synchronization timing signal at the first controlling means;

first transceiving means electrically coupled to the first controlling means for communicating over-the-air time division duplexing communication between the first base unit and at least one CT handset; and first synchronization transceiving means capable of transmitting and receiving signals over-the-air with at least one other base unit of the plurality of base units within the defined coverage area, the first synchronization transceiving means being electrically coupled to the first controlling means for transmitting over-the-air the synchronization timing signal from the first base unit to at least one other base unit of the plurality of base units within the defined coverage area;

a second base unit located within the defined coverage area, comprising:

second controlling means for controlling over-the-air time division duplexing communication for the second base unit;

second transceiving means electrically coupled to the second controlling means for communicating over-the-air time division duplexing communication between the second base unit and at least one CT handset; and second synchronization transceiving means capable of transmitting and receiving signals over-the-air with at least one other base unit of the plurality of base units respectively within the defined coverage area, the second synchronization transceiving means being electrically coupled to the second controlling means for receiving the synchronization timing signal transmitted over-the-air by the first synchronization transceiving means and coupling the synchronization timing signal to the second controlling means for synchronizing time division duplexing communication to the synchronization timing signal at the second controlling means; and first and second CT handsets for communicating over-the-air time division duplexing communication with at least one of the plurality of base units within the defined coverage area, the first transceiving means communicating over-the-air with the first CT handset and the second transceiving means communicating over-the-air with the second CT handset, the time division duplexing communication between the first and second CT handsets and the first and second transceiving means, respectively, being synchronized to the synchronization timing signal.

11. The telepoint communication system of claim 10, wherein the first and second synchronization transceiving means communicate the synchronization timing signal over one communication channel allocated within a CT-2 frequency band.

12. The telepoint communication system of claim 11, wherein the first synchronization transceiving means comprises synchronization transmit channel selection means for selecting one free outer-most communication channel of the CT-2 frequency band for transmitting the synchronization timing signal thereon, and wherein the second synchronization transceiving means comprises synchronization receive channel selection means for selecting one outer-most communication channel of the CT-2 frequency band that is carrying the synchronization timing signal thereon for receiving the synchronization timing signal therefrom.

13. The telepoint communication system of claim 11, wherein the synchronization timing signal transmitted over the one communication channel allocated within a CT-2 frequency band comprises a series of MUX2 frames, each MUX2 frame comprising a MUX2 burst transmission and a MUX2 pause time interval, and wherein the second controlling means comprises:

bit-synchronizing means for bit-synchronizing over-the-air time division duplexing communication to each MUX2 burst transmission in the synchronization timing signal; and frame-synchronizing means for frame-synchronizing over-the-air time division duplexing communication to each MUX2 burst transmission in the synchronization timing signal, the bit-synchronizing means and the frame-synchronizing means operating to synchronize time division duplexing communication to the synchronization timing signal at the second controlling means.

14. A telepoint communication system, comprising
a plurality of cordless telephone (CT) handsets; and
a plurality of base units geographically located within a defined coverage area, the plurality of base units being capable of maintaining synchronization of time division duplexing communication over-the-air between the plurality of CT handsets and the plurality of base units, each of the plurality of base units comprising:
synchronization transceiving means capable of transmitting and receiving over-the-air a synchronization timing signal, a selected one of the plurality of base units transmitting over-the-air the synchronization timing signal and the rest of the plurality of base units receiving from over-the-air the synchronization timing signal synchronizing time division duplexing communication transmit-and-receive duty cycle timing to the timing information provided by the received synchronization timing signal between the plurality of CT handsets and the plurality of base units located within the defined coverage area.

15. A telepoint communication system capable of maintaining synchronization of time division duplexing communication between a plurality of portable radiotelephone transceivers and a plurality of stationary communication units geographically located within a defined coverage area, the telepoint communication system comprising:
(a) the plurality of stationary communication units including a master stationary communication unit and at least one slave stationary communication unit, the master and the at least one slave stationary communication units being capable of transmitting and receiving a synchronization timing signal over-the-air and synchronizing time division duplexing communications to the synchronization timing signal, the plurality of stationary communication units being located within a defined coverage area, the master stationary communication unit comprising:
(1) a master controller for controlling over-the-air time division duplexing communication for the master stationary communication unit, the over-the-air time division duplexing communication being synchronized to the synchronization timing signal that is generated at the master controller when the master controller is operating in a master mode, and is received at the master controller when the master controller is operating in a slave mode;
(2) at least one master transceiver electrically coupled to the master controller for communicating over-the-air time division duplexing communication between the master stationary communication unit and at least one portable radiotelephone transceiver, the time division duplexing communication being synchronized to the synchronization timing signal at the master controller; and
(3) a master synchronization transceiver capable of transmitting and receiving a transmission over-the-air comprising the synchronization timing signal, the master synchronization transceiver being electrically coupled to the master controller for transmitting over-the-air a transmission comprising the synchronization timing signal generated at the master controller when the master controller is operating in a master mode, and for receiving an over-the-air transmission comprising the synchronization timing signal and coupling the received synchronization timing signal to the master controller when the master controller is operating in a slave mode,
the master controller being capable of determining whether the master controller is operating in the master mode or the slave mode; and
when operating in the master mode the master controller is capable of determining whether the master synchronization transceiver is transmitting over-the-air the synchronization timing signal, and when not transmitting over-the-air the synchronization timing signal the master controller can switch mode to operate in the slave mode, and
when operating in the slave mode the master synchronization transceiver can receive an over-the-air transmission comprising the synchronization timing signal and couple the received synchronization timing signal to the master controller for synchronizing time division duplexing communication at the at least one master transceiver to the received synchronization timing signal at the master controller; and
(b) a plurality of portable radio telephone transceivers including a first and second portable radiotelephone transceivers,
the first portable radiotelephone transceiver communicating over-the-air time division duplexing communication with one of the at least one master transceiver, and
the second portable radiotelephone transceiver communicating over-the-air time division duplexing communication with one of the at least one slave stationary communication unit, the time division duplexing communication between the first and second portable radiotelephone transceivers and the one of the at least one master transceiver and the one of the at least one slave stationary communication unit, respectively, being synchronized to the synchronization timing signal, for maintaining synchronization of time division duplexing communication between a plurality of portable radiotelephone transceivers and a plurality of stationary communication units including the master and the at least one slave stationary communication units geographically located within the defined coverage area.

16. The telepoint communication system of claim 15, wherein each slave stationary communication unit of the at least one slave stationary communication unit comprising:
(1) a slave controller for controlling over-the-air time division duplexing communication for the slave stationary communication unit, the over-the-air time division duplexing communication being synchronized to the synchronization timing signal that is generated at the slave controller when the slave controller is operating in a master mode, and is received at the slave controller when the slave controller is operating in a slave mode;

(2) at least one slave transceiver electrically coupled to the slave controller for communicating over-the-air time division duplexing communication between the slave stationary communication unit and at least one portable radiotelephone transceiver, the time division duplexing communication being synchronized to the synchronization timing signal at the slave controller; and (3) a slave synchronization transceiver capable of transmitting and receiving a transmission over-the-air comprising the synchronization timing signal, the slave synchronization transceiver being electrically coupled to the slave controller for transmitting over-the-air the transmission comprising the synchronization timing signal generated at the slave controller when the slave controller is operating in a master mode, and for receiving an over-the-air transmission comprising the synchronization timing signal and coupling the received synchronization timing signal to the slave controller when the slave controller is operating in a slave mode, the slave controller being capable of determining whether the slave controller is operating in the master mode or the slave mode, and when operating in the slave mode the slave synchronization transceiver can receive an over-the-air transmission comprising the synchronization timing signal and couple the received synchronization timing signal to the slave controller for synchronizing time division duplexing communication at the at least one slave transceiver to the received synchronization timing signal at the slave controller, the slave controller being capable of determining that it is not receiving the synchronization timing signal from the slave synchronization transceiver and after waiting a predetermined time interval with no reception of the synchronization timing signal the slave controller can switch mode to operate in the master mode, and, when operating in the master mode the slave controller is capable of generating the synchronization timing signal and coupling the synchronization timing signal to the slave synchronization transceiver for transmitting over-the-air a transmission including the synchronization timing signal generated at the slave controller, the slave controller being capable of determining whether the slave synchronization transceiver is transmitting over-the-air the synchronization timing signal, and when not transmitting over-the-air the synchronization timing signal the slave controller can switch mode to operate in the slave mode.

17. The telepoint communication system of claim 16, wherein the slave controller operating in the slave mode is capable of determining that it is not receiving the synchronization timing signal from the slave synchronization transceiver, and can wait a random time interval with no reception of the synchronization timing signal to determine that it is not receiving the synchronization timing signal, upon determination that the slave controller is not receiving the synchronization timing signal from the slave synchronization transceiver during the random time interval the slave controller can switch mode to operate in the master mode.

* * * * *